United States Patent
Tse et al.

(10) Patent No.: US 11,329,751 B2
(45) Date of Patent: *May 10, 2022

(54) NETWORK SWITCH AND OPTICAL TRANSPONDER CONNECTIVITY VERIFICATION FOR WAVELENGTH DIVISION MULTIPLEXING NETWORK

(71) Applicant: AT&T Intellectual Property I, L.P., Atlanta, GA (US)

(72) Inventors: Simon Tse, Holmdel, NJ (US); Martin Birk, Holmdel, NJ (US); Shweta Vachhani, Edison, NJ (US); Kathleen Tse, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,975

(22) Filed: May 17, 2021

(65) Prior Publication Data
US 2021/0273738 A1   Sep. 2, 2021

Related U.S. Application Data

(63) Continuation of application No. 16/834,352, filed on Mar. 30, 2020, now Pat. No. 11,012,174, which is a
(Continued)

(51) Int. Cl.
*H04J 14/02* (2006.01)
*H04B 10/25* (2013.01)
*H04Q 11/00* (2006.01)

(52) U.S. Cl.
CPC ............ *H04J 14/021* (2013.01); *H04B 10/25* (2013.01); *H04Q 11/0005* (2013.01); *H04J 14/02* (2013.01); *H04Q 2011/0016* (2013.01)

(58) Field of Classification Search
CPC ........ H04J 14/021; H04J 14/02; H04B 10/25; H04B 10/0773; H04Q 11/0005;
(Continued)

(56) References Cited

U.S. PATENT DOCUMENTS

| | | |
|---|---|---|
| 5,353,339 A | 10/1994 | Scobee |
| 6,005,696 A | 12/1999 | Joline et al. |

(Continued)

*Primary Examiner* — Dibson J Sanchez (57) ABSTRACT

Devices, computer-readable media and methods are disclosed for verifying that an optical transmit/receive device is correctly installed. For example, a processing system including at least one processor may activate a first light source of an optical transmit/receive device of a telecommunication network and detect a receiving of a light from the first light source at a port of an optical add/drop multiplexer of the telecommunication network. The processing system may then verify the optical transmit/receive device and the port of the optical add/drop multiplexer match a network provisioning order, when the receiving of the light from the first light source is detected, and may generate an indication that the optical transmit/receive device is correctly installed, when the optical transmit/receive device and the port of the optical add/drop multiplexer match the network provisioning order.

20 Claims, 4 Drawing Sheets

Related U.S. Application Data continuation of application No. 16/047,798, filed on Jul. 27, 2018, now Pat. No. 10,608,774.

(58) Field of Classification Search
CPC ... H04Q 2011/0016; H04Q 2011/0079; H04Q 11/0062
USPC .......................................... 398/9–38, 43–103
See application file for complete search history.

(56) References Cited

U.S. PATENT DOCUMENTS

| | | | |
|---|---|---|---|
| 6,108,113 A | 8/2000 | Fee | |
| 6,317,535 B1* | 11/2001 | Jennings | G01M 11/3136 385/24 |
| 6,804,463 B1* | 10/2004 | Arecco | H04Q 11/0005 398/16 |
| 6,834,139 B1* | 12/2004 | Prairie | H04L 43/0811 370/216 |
| 6,862,380 B2 | 3/2005 | Chaudhuri | |
| 6,980,736 B1 | 12/2005 | Fee | |
| 7,603,033 B1 | 10/2009 | Lumetta et al. | |
| 7,711,267 B2 | 5/2010 | Wellbrock et al. | |
| 8,180,216 B2 | 5/2012 | Kia et al. | |
| 8,509,621 B2 | 8/2013 | Boertjes et al. | |
| 8,619,246 B2 | 12/2013 | Hisamoto | |
| 9,432,113 B2 | 8/2016 | Oi et al. | |
| 9,628,340 B2 | 4/2017 | Blair | |
| 9,680,569 B2 | 6/2017 | Archambault et al. | |
| 9,692,544 B2 | 6/2017 | Wellbrock et al. | |
| 9,698,902 B2 | 7/2017 | Nakamura et al. | |
| 9,742,500 B2 | 8/2017 | Kachita et al. | |
| 9,800,472 B2 | 10/2017 | Spock et al. | |
| 9,806,973 B2 | 10/2017 | Htay et al. | |
| 9,882,634 B1 | 1/2018 | Al Sayeed et al. | |
| 9,887,774 B2 | 2/2018 | Huang et al. | |
| 9,900,089 B2 | 2/2018 | Yuki et al. | |
| 10,009,671 B2 | 6/2018 | Younce et al. | |
| 10,015,057 B2 | 7/2018 | Djukie et al. | |
| 10,097,303 B2 | 10/2018 | Papakos et al. | |
| 2002/0003639 A1 | 1/2002 | Arecco et al. | |
| 2002/0041409 A1 | 4/2002 | Laham et al. | |
| 2002/0149812 A1 | 10/2002 | Hong et al. | |
| 2002/0159113 A1 | 10/2002 | Tokunaga | |
| 2004/0096216 A1 | 5/2004 | Ito | |
| 2004/0165888 A1 | 8/2004 | Gerstel et al. | |
| 2004/0175171 A1 | 9/2004 | Kokkinos | |
| 2004/0223759 A1 | 11/2004 | Fee | |
| 2006/0153070 A1 | 7/2006 | DelRegno et al. | |
| 2008/0232760 A1 | 9/2008 | Kia | |
| 2008/0304834 A1* | 12/2008 | Fan | H04J 3/1694 398/137 |
| 2008/0310835 A1* | 12/2008 | Lorentzen | H04B 10/0773 398/9 |
| 2009/0067836 A1 | 3/2009 | Liu et al. | |
| 2009/0154918 A1 | 6/2009 | Hinderthuer et al. | |
| 2009/0324240 A1 | 12/2009 | Ishiguro | |
| 2010/0253936 A1 | 10/2010 | Kia et al. | |
| 2010/0266275 A1 | 10/2010 | Kia et al. | |
| 2010/0272431 A1 | 10/2010 | Chen | |
| 2010/0290785 A1 | 11/2010 | Hinderthur et al. | |
| 2011/0085801 A1 | 4/2011 | Palacharia | |
| 2011/0142439 A1 | 6/2011 | Chen et al. | |
| 2011/0142440 A1 | 6/2011 | Kia et al. | |
| 2011/0200324 A1 | 8/2011 | Boertjes et al. | |
| 2011/0243558 A1 | 10/2011 | Iizawa et al. | |
| 2012/0042213 A1 | 2/2012 | Zimmerman | |
| 2012/0224170 A1 | 9/2012 | Hisamoto | |
| 2012/0294613 A1 | 11/2012 | Hood et al. | |
| 2012/0301134 A1 | 11/2012 | Davari et al. | |
| 2012/0301137 A1 | 11/2012 | Sakamoto | |
| 2012/0321296 A1 | 12/2012 | Wellbrock et al. | |
| 2013/0195462 A1 | 8/2013 | Ghioni et al. | |
| 2013/0259474 A1 | 10/2013 | Ji et al. | |
| 2013/0294770 A1 | 11/2013 | Hino et al. | |
| 2013/0315579 A1 | 11/2013 | Kia et al. | |
| 2014/0112658 A1 | 4/2014 | Hurley | |
| 2014/0355981 A1 | 12/2014 | Miyazaki | |
| 2015/0063816 A1* | 3/2015 | Papakos | G08B 21/18 398/83 |
| 2015/0086192 A1 | 3/2015 | Sakamoto | |
| 2015/0104170 A1 | 4/2015 | Xia et al. | |
| 2015/0208146 A1 | 7/2015 | Vounce et al. | |
| 2016/0315701 A1 | 10/2016 | Vuki et al. | |
| 2017/0054508 A1 | 2/2017 | Kobayashi et al. | |
| 2017/0104530 A1 | 4/2017 | Nagata et al. | |
| 2017/0222747 A1 | 8/2017 | Ban et al. | |
| 2018/0175962 A1 | 6/2018 | Magri et al. | |
| 2018/0295130 A1 | 10/2018 | Vounce et al. | |

\* cited by examiner

NETWORK SWITCH AND OPTICAL TRANSPONDER CONNECTIVITY VERIFICATION FOR WAVELENGTH DIVISION MULTIPLEXING NETWORK

This application is a continuation of U.S. patent application Ser. No. 16/834,352, filed on Mar. 30, 2020, now U.S. Pat. No. 11,012,174, which is a continuation of U.S. patent application Ser. No. 16/047,798, filed on Jul. 27, 2018, now U.S. Pat. No. 10,608,774, all of which are herein incorporated by reference in their entirety.

The present disclosure relates generally to telecommunication network operations, e.g., in a wavelength division multiplexing (WDM) network, and more particularly to devices, computer-readable media, and methods for verifying that an optical transmit/receive device is correctly installed.

BACKGROUND

Reconfigurable optical add/drop multiplexers (ROADMs) are increasingly being used in dense-wavelength-division-multiplexed (DWDM) networks. However, tail installation (e.g., installation of transponders and switches) remains subject to manual error. For instance, network personnel or an installation vendor may physically install a transponder and Ethernet switch by connecting these devices to each other, and by connecting the transponder to a ROADM using fiber optic patch cords. In one example, the installer may install the device(s) and fiber(s), and then walk away and assume the physical connectivity is correct. In other cases, the installer may call a network provisioning center to advise that the device(s) and fiber(s) have been installed, and then wait on-site until the network provisioning center verifies connectivity by turning up a circuit, e.g., a wavelength connection, that utilizes the tail. When the circuit is verified, the installation is then deemed to be correct. In turn, the installer may be informed that the installation is complete and is allowed to depart from the installation site. Such verification approach may incur a certain amount of potential down time for the installer.

SUMMARY

In one example, the present disclosure describes a device, computer-readable medium, and method for verifying that an optical transmit/receive device is correctly installed. For example, a processing system including at least one processor may activate a first light source of an optical transmit/receive device of a telecommunication network and detect a receiving of a light from the first light source at a port of an optical add/drop multiplexer of the telecommunication network. The processing system may then verify the optical transmit/receive device and the port of the optical add/drop multiplexer match a network provisioning order, when the receiving of the light from the first light source is detected, and generate an indication that the optical transmit/receive device is correctly installed, when the optical transmit/receive device and the port of the optical add/drop multiplexer match the network provisioning order.

In another example, the present disclosure describes a device, computer-readable medium, and method for verifying that an optical transmit/receive device (e.g., a transponder) is correctly installed. For example, a processing system including at least one processor may activate a first light source of a first one of: an optical transponder of a telecommunication network or a network switch of the telecommunication network, and detect a receiving of a light from the first light source at a different one of: the optical transponder or the network switch. The processing system may then verify the optical transponder and the network switch match a network provisioning order, when the receiving of the light from the first light source is detected, and generate an indication that the optical transponder is correctly installed, when the optical transponder and the network switch match the network provisioning order.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for verifying that an optical transmit/receive device is correctly installed. Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services.

Advancing SDN architectures also extend to the physical layer, with the introduction of devices such as reconfigurable optical add/drop multiplexers (ROADM) to the optical network, e.g., a wavelength division multiplexing (WDM) network, such as a dense wavelength division multiplexing (DWDM) network. Software-controlled ROADMs manage data traveling over high-capacity fiber optic lines and can automatically detect and adjust bandwidth, move traffic to different lanes, turn off wavelengths for a variety of different reasons, and so forth. SDN components relating to the physical layer (e.g., optical components) may additionally include transceivers, transponders, muxponders, or the like, as well as optical or electro/optical components of switches (e.g., Ethernet switches), layer 3 switches/multi-layer switches, routers (e.g., routers which may also include switching functions), or the like. Similar to other SDN components (e.g., virtual network functions (VNFs) for layer 3 services, application layer services, etc.), these optical components may be turned on and off, and configured and reconfigured at any time. In addition, such components may be installed but remain inactive until an SDN controller determine that the components should be activated for one or more wavelength connections.

A work order to install a new transponder or switch may be generated in response to a customer or network need. For instance, network planning personnel may determine that a new wavelength connection beginning at one location and ending in another may be required. An installer may therefore install the transponder and/or the switch in response to the work order, and notify a network provisioning center. The network provisioning center personnel may then activate the circuit associated with the new transponder and/or switch and determine if end to end traffic is supported. When the circuit is verified, the installation is deemed to be correct and the installer may be informed that the installation is complete. This may provide a verification when the physical installation is performed correctly. However, if there is an error in exchanging high speed bits at the transport layer, the error would not necessarily indicate there is a physical connectivity problem. The issue could be with higher layers or in different geographic/physical portions of the network. For example, there could be a problem at a repeater in the optical network, while the new components may have a correct physical installation. This can lead to wasted efforts in troubleshooting the physical connectivity, which may already be correct, or may fail to isolate an error to a physical connectivity problem relating to the new components, which can lead to wasted troubleshooting efforts elsewhere.

In addition, as stated above, it may no longer be the case that newly installed transponders and/or switches will be immediately activated into a functioning circuit/wavelength connection. For instance, an Ethernet switch and transponder may be "pre-cabled" to each other and/or to a ROADM. Therefore, end-to-end verification may not even be able to provide a positive indication when new transponders and/or switches are correctly installed. In contrast, examples of the present disclosure verify correct physical connections at installation time, regardless of whether and when new transponders and/or switches may be activated.

In one example, once a transponder is physically connected to a ROADM, a light source may be activated via the transponder on the ROADM side. Incoming light may then be detected at one of the ROADM add/drop (shared resource group (SRG)) ports to identify that the transponder is connected to the particular ROADM add/drop port. In one example, when the light is detected, the light source may be turned off from the transponder, and then no light may be detected at the same one of the ROADM add/drop ports. In one example, the activation and deactivation may be repeated at least two times to verify the pairing of the transponder light source and the ROADM add/drop port.

It should be noted that in some examples, a network switch may include an integrated optical transceiver that is connected to an optical transponder with a connection to a ROADM add/drop port. For instance, the network switch may include a small form factor pluggable (SFP) transceiver or the like (e.g., a 4.5 Gb/s transceiver, a 10 Gb/s optical transceiver, etc.). The transceiver may be a "gray light" transceiver or "colored light" transceiver. The external optical transponder may also include the same quality optics on the network switch side. However, on the ROADM/line side, the external optical transponder may have higher quality optics such as a C-form factor pluggable (CFP) optical transceiver or the like (e.g., a 100 Gb/s optical transceiver, and 200 Gb/s optical transceiver, etc.) for metro or long-haul transport network applications. In these types of deployments, examples of the present disclosure may include a turning on (and off) of a light source at either or both of the network switch optical transceiver and the external optical transponder, and then detecting a received light (and/or no light) at the receiver side to identify the connection between the external optical transponder and the integrated optical transceiver of the network switch (e.g., the particular integrated optical transponder and/or a particular slot of the network switch containing the integrated optical transponder).

In one example, the process of light source activation and light detection of the present disclosure may be initiated by an optical transponder (and/or a network switch containing an optical transceiver) when such a device is powered on according to a pre-configuration. In another example, the light source activation and light detection of the present disclosure may be initiated and/or performed remotely, e.g., by an SDN controller via one or more application programming interfaces (APIs) providing management access to and control of the respective device(s).

In one example, the present disclosure relates to a ROADM-based network according to an open standard, such as the Open ROADM Multi-Source Agreement. Unlike ROADMs that are vendor specific and highly proprietary, and which may require custom and static configuration and provisioning, open standard ROADMs and optical plug-ins allow multi-vendor interoperability where various equipment support standardized APIs. Examples of the present disclosure also enable automatic network topology updating by automatic, systematic, and accurate determination of tail connectivity (e.g., between an Ethernet switch and a transponder, and/or between a transponder and a ROADM port) in a ROADM-based network. In one example, network topology changes are automatically discovered and fed to a machine learning-based optical Path Computation Engine (PCE) for provisioning of new service(s), re-optimizing existing one(s), and so forth. For instance, the integrated, self-initiated, and automated connectivity discovery processes of the present disclosure confirm the connection, capture relevant network connectivity and resource information, and verify the readiness and proper operation of the optical resources. These and other aspects of the present disclosure are discussed in greater detail below in connection with the examples of FIGS. 1-4.

Figure 1:
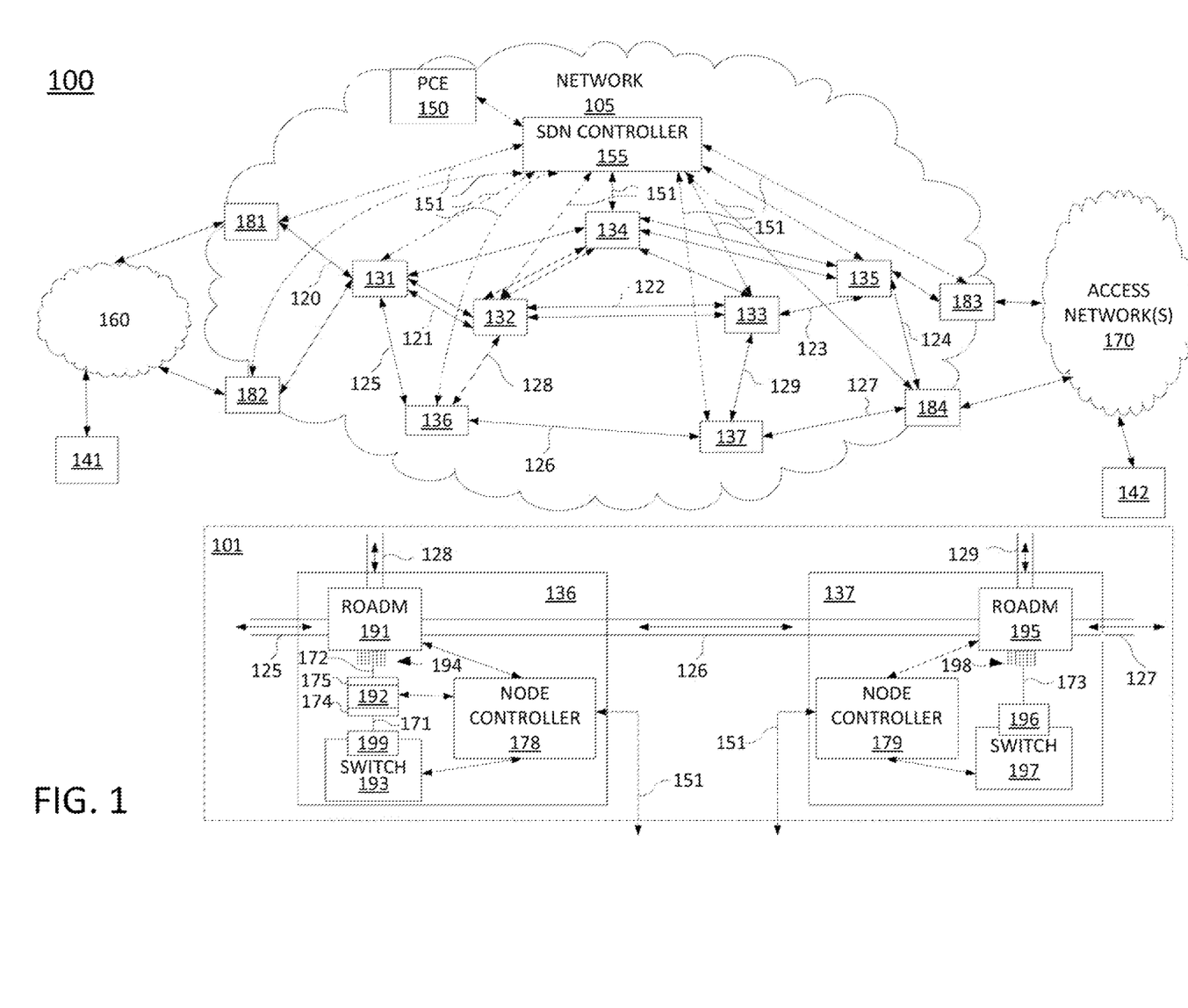
FIG. 1 illustrates an example system related to the present disclosure.

To aid in understanding the present disclosure, FIG. 1 illustrates an example system 100 comprising a plurality of different networks in which examples of the present disclosure for verifying that an optical transmit/receive device is correctly installed may operate. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. For instance, the network 105 may utilize IP routing (e.g., without MPLS). Furthermore, network 105 may comprise multiple networks utilizing different protocols, all utilizing a shared underlying WDM infrastructure (fibers, amplifiers, ROADMs, etc.), e.g., an optical transport network. In this regard, it should be noted that as referred to herein, "traffic"

may comprise all or a portion of a transmission, e.g., a sequence or flow, comprising one or more packets, segments, datagrams, frames, cells, PDUs, service data units, bursts, and so forth. The particular terminology or types of data units involved may vary depending upon the underlying network technology. Thus, the term "traffic" is intended to refer to any quantity of data to be sent from a source to a destination through one or more networks.

In one example, the network 105 may be in communication with networks 160 and networks 170. Networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, a peer network, and the like. In one example, the networks 160 and 170 may include different types of networks. In another example, the networks 160 and 170 may be the same type of network. The networks 160 and 170 may be controlled or operated by a same entity as that of network 105 or may be controlled or operated by one or more different entities. In one example, the networks 160 and 170 may comprise separate domains, e.g., separate routing domains as compared to the network 105. In one example, networks 160 and/or networks 170 may represent the Internet in general.

In one example, network 105 may transport traffic to and from user devices 141 and 142. For instance, the traffic may relate to communications such as voice telephone calls, video and other multimedia, text messaging, emails, and so forth between the user devices 141 and 142, or between the user devices 141 and/or 142 and other devices that may be accessible via networks 160 and 170. User devices 141 and 142 may comprise, for example, cellular telephones, smart phones, personal computers, other wireless and wired computing devices, private branch exchanges, customer edge (CE) routers, media terminal adapters, cable boxes, home gateways and/or routers, and so forth.

As stated above, network 105 comprises a WDM network (e.g., a dense wavelength division multiplexing (DWDM) network). Accordingly, in one example, the nodes 131-137 may include optical components, such as ROADMs, and the links between nodes 131-137 may comprise fiber optic cables. For ease of illustration, a portion of the links is specifically labeled as links 120-129. Inset 101 illustrates a portion of the network 105 comprising nodes 136 and 137, and links 125-129. As shown in inset 101, node 136 includes a ROADM 191 coupled to links 125, 126, and 128, a plurality of add/drop ports 194, and a network switch 193 coupled to the ROADM 191 via one of the plurality of add/drop ports 194 and a transponder 192. It should be noted that the network switch 193 may include a transceiver 199 which is coupled to the transponder 192 via a fiber optic patch cord 171. The transponder 192 may include a client side transceiver 174 (which in one example may comprise the same or similar quality optics as the transceiver 199, e.g., an SFP transceiver, a 10 Gb small form factor pluggable (XFP) transceiver, or the like) and a ROADM side/line side transceiver 175 (which may comprise higher quality optics for transmitting and receiving signals over longer distances between nodes of the network 105, e.g., hundreds of kilometers up to 2,000 or more kilometers) coupled to one of the add/drop ports 194 via a fiber optic patch cord 172. In one example, the transceiver 192 may comprise a muxponder that may aggregate several lower bandwidth signals from network switch 193 and/or from one or more other network switches, routers, or other client devices at node 136 into a combined signal for transmission over one of the network links 125, 126, or 128.

Similarly, node 137 includes a ROADM 195 coupled to links 126, 127, and 129, a plurality of add/drop ports 198, and a network switch 197 coupled to ROADM 195 via a patch cord 173 between one of the plurality of add/drop ports 198 and a transponder 196. It should be noted that as illustrated in FIG. 1, the transponder 196 may be integrated within network switch 197, e.g., within a pluggable slot (such as an CFP or CFP2 slot, an QSFP28 slot, or the like). In one example, transponder 196 may be capable of transmitting and/or receiving optical signals for use in metro or transport applications at data rates of 100 Gb/s or greater. However, in another example, transponder 196 may transmit and receive at lower data rates, such as 25 Gb/s, 10 Gb/s etc. ROADMs 191 and 195 may comprise colorless ROADMs, directionless ROADMs, colorless and directionless ROADMs (CD ROADMs), a contentionless ROADM, e.g., a colorless, directionless, and contentionless (CDC) ROADM, and so forth. Additionally, it should be noted that these ROADMs may include Open ROADMs with open standards allowing interoperability of different ROADMs manufactured by different vendors.

It should be noted that in each of nodes 136 and 137, any number of routers, switches, application servers, and the like may be connected to one of the plurality of add/drop ports 194 or plurality of add/drop ports 198, e.g., via additional transponders and/or transceivers. In addition, in other examples, additional components, such as additional ROADMs, may be connected to one of the plurality of add/drop ports 194 or plurality of add/drop ports 198. For instance, in another example, node 137 may include a number of ROADMs, WSSs, and other components that are interconnected to provide a higher degree node. In addition, as referred to herein the terms "switch" and "network switch" may refer to any of a number of similar devices, e.g., including: a layer 2 switch (e.g., an Ethernet switch), a layer 3 switch/multi-layer switch, a router (e.g., a router which may also include switching functions), or the like. It should also be noted that nodes 131-135 may have a same or similar setup as nodes 136 and 137. In addition, in one example, any one or more of components 181-184 may also comprise an optical node with a same or similar setup as nodes 136 and 137.

Figure 4:
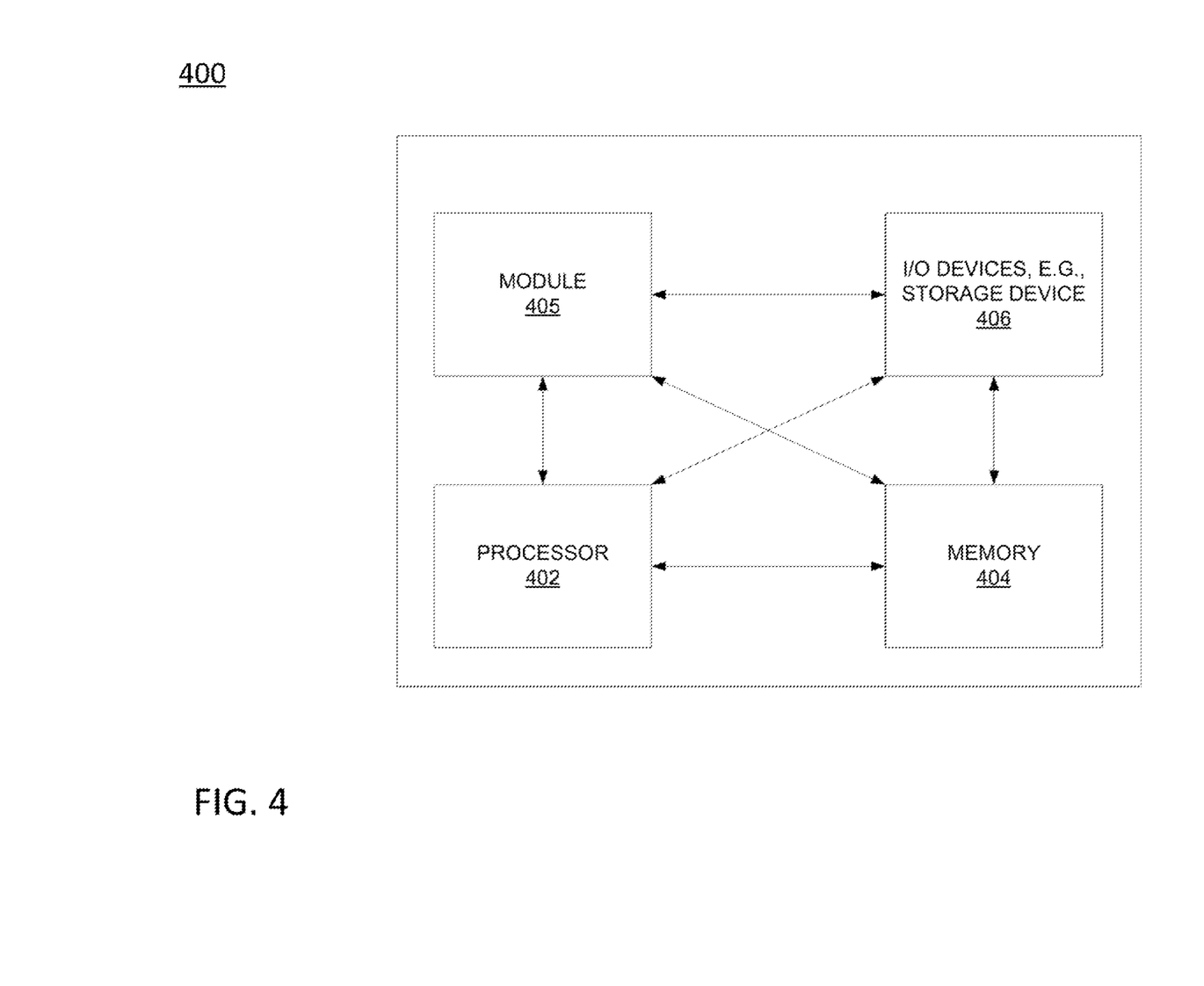
FIG. 4 illustrates an example high-level block diagram of a computer specifically programmed to perform the steps, functions, blocks, and/or operations described herein.

As further illustrated in FIG. 1, network 105 includes a software defined network (SDN) controller 155 and a path computation element (PCE) 150. In one example, the SDN controller 155 may comprise a computing system or server, such as computing system 400 depicted in FIG. 4, and may be configured to provide one or more operations or functions for verifying that an optical transmit/receive device is correctly installed. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., a computing system as illustrated in FIG. 4 and discussed below) or multiple computing devices collectively configured to perform various steps, functions, and/or operations in accordance with the present disclosure. In addition, with respect to ROADMs, "configured" and "reconfigured" may refer to instructions to adjust a wavelength selective switch (WSS) to route different wavelengths to different fibers/links and/or to different add/drop ports. With respect to network switches and transponders, "configured" and "reconfigured" may refer to instructions to send or receive at a particular bitrate, to utilize a particular transmit power, to transmit or receive on a particular wavelength, and the like.

In one example, nodes 131-137 and components 181-184 (and/or the devices therein) may be controlled and managed by SDN controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. Thus, various components of network 105 may comprise virtual network functions (VNFs) which may physically comprise hardware executing computer-readable/computer-executable instructions, code, and/or programs to perform various functions. For example, the functions of SDN controller 155 may include the selection of a network function virtualization infrastructure (NFVI) from among various NFVIs available at nodes 131-137 in network 105 to host various devices, such as routers, gateways, switches, route reflectors, firewalls, media servers, and so forth. To illustrate, network switches 193 and 197 may physically reside on host devices that may be configured to be a firewall, a media server, a network switch, a router, and so forth.

In addition, SDN controller 155 may also manage the operations of optical components of the network 105. For instance, SDN controller 155 may configure paths for wavelength connections via the network 105 by configuring and reconfiguring ROADMs at nodes 131-137 and components 181-184. For example, SDN controller 155 may provide instructions to control wavelength selective switches (WSSs) within the ROADMs, as well as transceivers and/or transponders connected to the ROADM add/drop ports. In one example, SDN controller 155 may maintain communications with nodes 131-137 and components 181-184 (and/or the devices therein) via a number of control links 151 which may comprise secure tunnels for signaling communications over an underling IP infrastructure of network 105, e.g., including fibers/links 120-129, etc. In other words, the control links 151 may comprise virtual links multiplexed with transmission traffic and other data traversing network 105 and carried over a shared set of physical links. Alternatively, or in addition, the control links 151 may comprise out-of-band links, e.g., optical or non-optical connections that are different from fibers/links 120-129. In one example, SDN controller 155 may be in communication with node controllers at each node 131-137 (and in one example at components 181-184). For example, node controllers 178 and 179 may be responsible for instantiating and releasing instances of virtual machines at nodes 136 and 137 respectively, and for configuring and reconfiguring operations of associated ROADMs, such as ROADMs 191 and 195, transponders 192 and 196, transceiver 199, network switches 193 and 197, and so on. Thus, in one example, node controllers 178 and 179 may receive instructions for configuring and reconfiguring ROADMs 191 and 195 from SDN controller 155, e.g., via control links 151. Alternatively, or in addition, control links 151 may provide connections between SDN controller 155 and ROADMs 191 and 195, transponders 192 and 196, transceiver 199, and network switches 193 and 197 without the involvement of separate node controllers 178 and 179. In one example, the SDN controller 155 may also comprise a virtual machine operating on one or more NFVI/host devices, or may comprise one or more dedicated devices. For instance, SDN controller 155 may be collocated with one or more VNFs, may be deployed in one or more different host devices, or at a different physical location or locations, and so forth.

In addition, in one example, SDN controller 155 may represent a processing system comprising a plurality of controllers, e.g., a multi-layer SDN controller, one or more federated layer 0/physical layer SDN controllers, and so forth. For instance, a multi-layer SDN controller may be responsible for instantiating, tearing down, configuring, reconfiguring, and/or managing layer 2 and/or layer 3 VNFs (e.g., a network switch, a layer 3 switch and/or a router, etc.), whereas one or more layer 0 SDN controllers may be responsible for activating and deactivating optical networking components, for configuring and reconfiguring the optical networking components (e.g., to provide circuits/wavelength connections between various nodes or to be placed in idle mode), for receiving management and configuration information from such devices, for instructing optical devices at various nodes to engage in testing operations in accordance with the present disclosure, and so forth. In one example, the layer 0 SDN controller(s) may in turn be controlled by the multi-layer SDN controller. For instance, each layer 0 SDN controller may be assigned to nodes/optical components within a portion of the network 105. In addition, these various components may be co-located or distributed among a plurality of different dedicated computing devices or shared computing devices (e.g., NFVI) as described herein.

As mentioned above, examples of the present disclosure may provide operations for verifying that an optical transponder is correctly installed. In the example of FIG. 1, the network switch 193 and transponder 192 may be newly connected to each other and/or to the ROADM 191 via patch cords 171 and 172, respectively. For instance, a network technician may have physically made the connections with patch cords 171 and 172, and powered on the network switch 193 and transponder 192. In one example, the SDN controller 155 may receive a notification of the installation(s). The notification may be received from node controller 178, from the network switch 193 and/or transponder 192 (for instance, either or both of these devices may be configured to report to the SDN controller 155 in response to a power on condition), or from a device of the network technician.

In one example, the SDN controller 155 may access a network provisioning order to identify the correct installation of the network switch 193 and/or transponder 192. In particular, the SDN controller 155 may activate a light source (e.g., a laser) of the transponder 192 facing the ROADM 191 (e.g., transceiver 175) and detect a light at one of the ROADM add/drop ports 194 to identify that the transponder 192 is connected to the particular one of the ROADM add/drop ports 194. In one example, when the light is detected, the light source may be turned off from the transponder 192, and then no light may be detected at the same one of the ROADM add/drop ports 194. In one example, the activation and deactivation may be repeated at least two times to verify the pairing between the transponder 192 and the particular one of the ROADM add/drop ports 194.

In one example, SDN controller 155 may further verify the correct installation of a transponder using a network-based light source (e.g., another laser). For instance, SDN controller 155 may verify the correct installation of transponder 192 by activating (and deactivating) a light source at a different node in the network 105 (e.g., using a test set or a transponder that is not in use), configuring WSS(s) at ROADM(s) in the network node(s) to route the light from the network-based light source to node 136, and configuring ROADM 191 of node 136 to direct the light from the network-based light source to the particular one of the ROADM add/drop ports 194. The transponder 192 may then detect the light (or light/no-light signal) from the one of the ROADM add/drop ports 194 to further verify the pairing between the transponder 192 and the particular one of the ROADM add/drop ports 194.

SDN controller 155 may similarly activate a light source of the transponder 192 facing the network switch 193 (e.g., transceiver 174, which may comprise a laser or light emitting diode (LED) transmitter) and detect a light at the transceiver 199, which may be installed in a particular slot of the network switch 193. In one example, when the light is detected, the light source may be turned off from the transponder 192, and then no light may be detected at the transceiver 199. In one example, the activation and deactivation may be repeated at least two times to verify the pairing between the transponder 192 and the network switch 193 (e.g., the pairing of the transponder 192 with the particular transceiver 199, or the slot in which the transceiver 199 is installed). In one example, the SDN controller 155 may also activate a light source of the network switch 193 (e.g., transceiver 199, which may comprise a laser or LED transmitter) and detect a light at the transponder 192 (e.g., at client-side transceiver 174). When the light is detected, the light source may be turned off from the network switch 193, and then no light may be detected at the transponder 192. In addition, the activation and deactivation may be repeated at least two times to further verify the pairing between the transponder 192 and the network switch 193 (e.g., the pairing of the transponder 192 with the particular transceiver 199, or the slot in which the transceiver 199 is installed).

Figure 2:
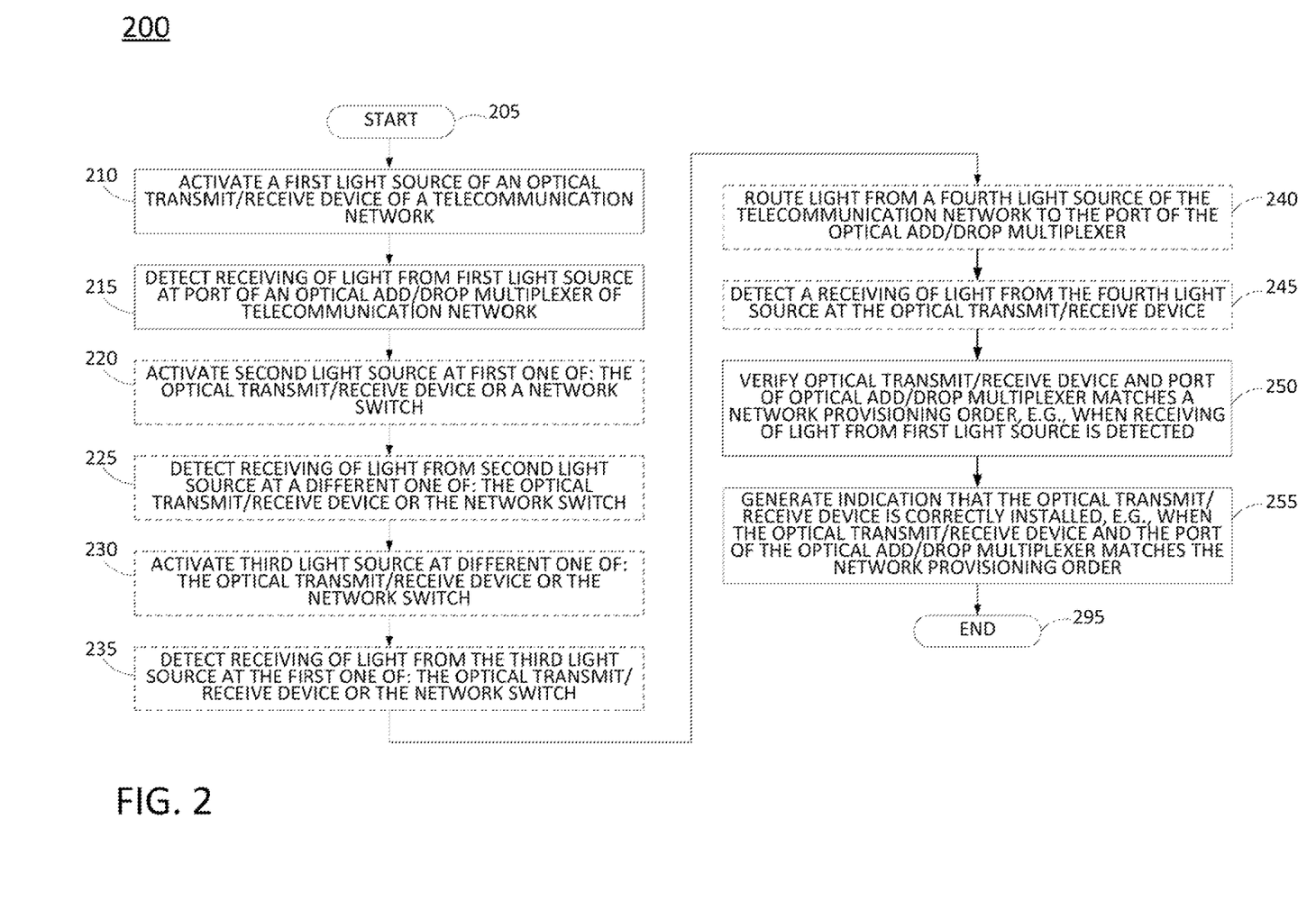
FIG. 2 illustrates a flowchart of a first example method for verifying that an optical transmit/receive device is correctly installed.
Figure 3:
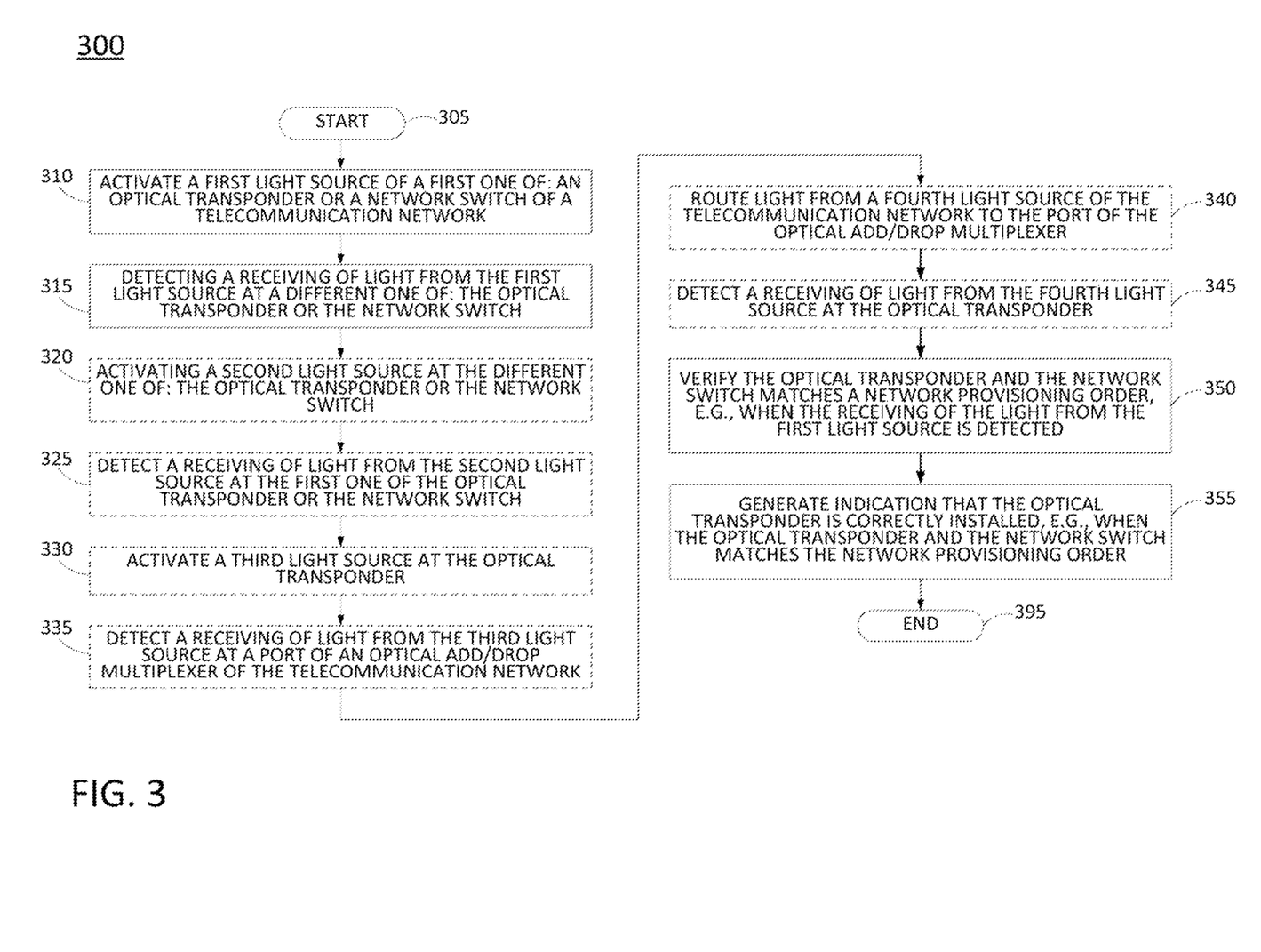
FIG. 3 illustrates a flowchart of a second example method for verifying that an optical transmit/receive device (e.g., a transponder) is correctly installed.

It should be noted that the foregoing example describes the verification of the connection between transponder 192 and the one of the add/drop ports 194 of ROADM 191 followed by the verification of the connection between the transponder 192 and the network switch 193. However, in another example, the order of these operations may be reversed. Similarly, the foregoing example describes the activation of a light source of transponder 192 and detection at network switch 193, followed by activation of a light source of network switch 193 and detection at transponder 192. However, in another example, the order of these operations may also be reversed. In addition, it should be noted that the correct installation of both the transponder 192 and network switch 193 may be verified at the same time or in connection with the same set of operations, or may be verified at entirely different times and in different circumstances. For instance, the transponder 192 may be installed and connected to the one of the ROADM add/drop ports 194 during a first installation session, while the network switch 193 may be installed and connected to the transponder 192 at another time, which could be hours, days, or weeks later. Thus, in connection with the example methods 200 and 300 below, the verification of correct installation of the transponder 192 may be with respect to the connection to ROADM 191 via patch cord 172, with respect to the connection to network switch 193 via patch cord 171, or both.

It should again be noted that in one example, the activation and deactivation of light sources may be directed by SDN controller 155 via instructions to the respective optical devices, e.g., via control links 151. However, in another example, one or more of the involved optical components (e.g., transponder 192 and/or network switch 193) may be pre-configured to engage in light activation and deactivation and/or light detection operations. For instance, transponder 192 and/or network switch 193 may be pre-configured to activate and deactivate light sources via the respective transceivers in response to being powered on. In addition, either or both of these devices, and/or ROADM 191 may be configured to detect the on/off light pattern (e.g., a simple two cycle on/off pattern, or other low bitrate pattern) and to report the detection to SDN controller 155. Such an example may provide for tail device installation self-discovery where the control links 151 are not separate from links 125-129 and where there is no access of SDN controller 155 to the transponder 192 and network switch 193 except via the ROADM 191.

A similar process may be followed with respect to the installation of additional tail components at other network locations. For example, referring to node 137 that is illustrated in the inset 101 of FIG. 1, the network switch 197 and transponder 196 may be newly connected to the ROADM 195 via patch cord 173. For instance, a network technician may have physically made the connection between the transponder 196 of the network switch 197 and one of the add/drop ports 198 via patch cord 173. In one example, the SDN controller 155 may receive a notification of the installation(s). The notification may be received from node controller 179, from the network switch 197 (for instance, network switch 197 may be configured to report to the SDN controller 155 in response to a power on condition), or from a device of the network technician.

In one example, the SDN controller 155 may access a network provisioning order to identify the correct installation of the network switch 197 and/or transponder 196. In particular, the SDN controller 155 may activate a light source of the transponder 196 and detect a light at one of the ROADM add/drop ports 198 to identify that the transponder 196 is connected to the particular one of the ROADM add/drop ports 198. In one example, when the light is detected, the light source may be turned off from the transponder 196, and then no light is detected at the same one of the ROADM add/drop ports 198. In one example, the activation and deactivation may be repeated at least two times to verify the pairing between the transponder 196 and the particular one of the ROADM add/drop ports 198.

In one example, SDN controller 155 may further verify the correct installation of network switch 197 and/or transponder 196 by activating (and deactivating) a light source at a different node in the network 105 (e.g., using a test set or a transponder that is not in use), configuring WSS(s) at ROADM(s) in the network node(s) to route the light from the network-based light source to node 137, and configuring ROADM 195 of node 137 to direct the light from the network-based light source to the particular one of the ROADM add/drop ports 198. The network switch 197 may then detect the light (or light/no-light signal) at transponder 196 from the particular one of the ROADM add/drop ports

198 to further verify the pairing between the transponder 196 and the particular one of the ROADM add/drop ports 198.

As further illustrated in FIG. 1, the network 105 also includes a path computation element (PCE) 150. In one example, PCE 150 may comprise a computing system or server, such as computing system 400 depicted in FIG. 4, and may be configured to provide one or more operations or functions in accordance with the present disclosure. PCE 150 may be collocated with one or more of nodes 131-137, components 181-184, or SDN controller 155, or may be deployed at one or more different physical locations. In one example, network 105 may comprise a distributed PCE environment with multiple PCEs responsible for different zones, e.g., segregated by geographic area, by functionality type, etc. Thus, for example, PCE 150 may be selected to manage path utilizations in the portion of network 105 relating to components 181-184 and nodes 131-137. For instance, the PCE 150 may be selected by the SDN controller 155.

As illustrated in FIG. 1, PCE 150 may be in communication with SDN controller 155 and may provide path computation decisions, such as reachability determinations, to the SDN controller 155. In turn, SDN controller 155 may provision wavelength connections via paths identified by PCE 150. For instance, SDN controller 155 may receive a request to establish a wavelength connection from component 181 to component 184, e.g., to carry traffic between user devices 141 and 142. SDN controller 155 may then forward the request to PCE 150 to calculate a path. For illustrative purposes, PCE 150 may consider a candidate path comprising links 120, 121, 122, 123, and 124, and may make a reachability determination as part of a path computation process. If the path comprising links 120, 121, 122, 123, and 124 is determined to be "reachable" and if the path satisfies other criteria, such as being a least cost path, or a path that supports a least cost route as computed at a higher layer (e.g., for IP or IP/MPLS routing), the PCE 150 may return the path to SDN controller 155 for deployment. SDN controller 155 may then communicate with the nodes 131, 132, 133, and 135, and components 181 and 184 to configure ROADMs to maintain a wavelength connection over the path. It should be noted that although nodes 131, 132, 133, and 135 may include network switches and/or routers operating in the non-optical domain, a wavelength connection via the path comprising links 120, 121, 122, 123, and 124 may be optically switched through ROADMs at nodes 131, 132, 133, and 135 (and bypassing any routers (e.g., layer 3 routers) or non-optical switches) that may be present at the respective nodes. In one example, components 181 and 184 may be configured to add and drop the wavelength of the wavelength connection and to perform optical-electrical conversion and vice versa, e.g., via a transponder coupled to an add/drop port of a ROADM therein.

In this regard, PCE 150 may store various data in connection with managing path utilizations for telecommunication network tunnels. For instance, PCE 150 may maintain a topology information block (TIB) that includes records for various links/fibers between the nodes 131-137 and components 181-184 in network 105, such as the available wavelengths, the wavelengths assigned/in-use and/or the available/free wavelengths, the paths assigned to respective wavelengths, the fiber lengths, capacities, and ages, the availability of transponders, switches, and/or other infrastructure at various nodes, transponder and/or transceiver performance capabilities of the various nodes, information regarding any protection scheme involving a fiber, and/or any particular wavelengths that may be utilized over the fiber, and so forth. In this regard, the SDN controller 155 may provide information to PCE 150 regarding the statuses of transponders, network switches, and/or ROADMs, and regarding the connections between such devices that the SDN controller 155 may obtain in the course of the performance of operations for verifying that an optical transmit/receive device is correctly installed, as described herein. For instance, example methods 200 and 300 for verifying that an optical transmit/receive device is correctly installed are described in greater detail below.

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 155, PCE 150, and/or other network elements may comprise functions that are spread across several devices that operate collectively as a SDN controller, a PCE, etc. In another example, PCE 150 and SDN controller 155 may be integrated into a single device. In another example, PCE 150 may maintain its own connections to nodes 131-137 and components 181-184 and may send instructions to various devices to configure paths for wavelength connections in accordance with the present disclosure. In another example, nodes 131-137 and/or components 181-184 may include fiber loss test sets (FLTSs), optical time domain reflectometer (OT-DRs), PMD measurement devices, and the like which may be used to measure fiber loss and PMD over various links.

In addition, the foregoing includes examples where operations for verifying that an optical transmit/receive device is correctly installed are performed by SDN controller 155, and/or by SDN controller 155 in conjunction with other devices under the control and instruction of SDN controller 155. However, in other, further, and different examples, aspects of verifying that an optical transmit/receive device is correctly installed may include transponders and/or network switches performing one or more operations autonomously, such as a transponder and/or a transceiver activating and deactivating a light source upon being powered on, a ROADM detecting light at a previously inactive add/drop port and reporting the detection of the light to SDN controller 155, and so forth. Thus, these and other modifications of the system 100 are all contemplated within the scope of the present disclosure.

FIG. 2 illustrates a flowchart of an example method 200 for verifying that an optical transmit/receive device is correctly installed. In one example, steps, functions and/or operations of the method 200 may be performed by a network-based device, such as SDN controller 155 in FIG. 1, or any one or more components thereof, such as a processing system. Alternatively, or in addition, the steps, functions and/or operations of the method 200 may be performed by a processing system collectively comprising a plurality of devices as illustrated in FIG. 1, such as SDN controller 105, ROADM 191 and/or ROADM 195, transponders 192 and 196, and/or transceiver 199, network switches 193 and/or 197, node controllers 178 and/or 179, and so forth. In one example, the steps, functions, or operations of method 200 may be performed by a computing device or system 400, and/or a processing system 402 as described in connection with FIG. 4 below. For instance, the computing device 400 may represent at least a portion of a SDN controller, in accordance with the present disclosure. For illustrative purposes, the method 200 is described in greater detail below in connection with an example performed by a processing system, such as processing system 402, or a processing system comprising a plurality of devices. The method 200 begins in step 205 and proceeds to step 210.

At step 210, the processing system activates a first light source of an optical transmit/receive device of a telecommunication network. In one example, the optical transmit/receive device is coupled to an optical add/drop multiplexer (e.g., a ROADM) of the telecommunication network via a fiber optic patch cord. In one example, the optical transmit/receive device comprises a transceiver integrated into a network switch. In another example, the optical transmit/receive device comprises a transponder coupled to the port of the optical add/drop multiplexer and to a network switch (e.g., via a second fiber optic patch cord). In one example, the processing system includes the optical transmit/receive device and the first light source is activated by the optical transmit/receive device in response to the optical transmit/receive device (and/or a network switch containing the optical transmit/receive device) being powered on. In another example, the first light source is activated by the processing system via a remote command in response to a notification that the optical transmit/receive device (e.g., a transponder, or a transceiver and/or a network switch containing the transceiver) is installed. For instance, the processing system may comprise an SDN controller of the telecommunication network. The remote command may be in accordance with a remote access API, e.g., using YANG (Yet Another Next Generation) data modeling language via the NETCONF network configuration protocol.

At step 215, the processing system detects a receiving of light from the first light source at a port of the optical add/drop multiplexer (e.g., a ROADM) of the telecommunication network. For instance, the optical add/drop multiplexer may be configured to detect the presence or absence of light at particular add/drop ports, and may further be configured to report the detection of the presence or absence of light to the processing system via a remote API. For example, the processing system may comprise an SDN controller with one or more control links to the optical add/drop multiplexer. In one example, the optical add/drop multiplexer may report the detecting of the receiving of light from the first light source automatically, or may report in response to a query from the processing system.

At optional step 220, the processing system may activate a second light source at a first one of the optical transmit/receive device or the network switch, e.g., in an example where the optical transmit/receive device comprises a transponder. In one example, the second light source may also be activated via a remote command. In another example, the second light source may be part of a client side transceiver of the optical transmit/receive device and the second light source may be activated by the optical transmit/receive device in response to the optical transmit/receive device being powered on. It should be noted that the various light sources described in the method 200 may comprise lasers or LEDs. For instance, between an optical transceiver and the optical add/drop multiplexer the light source may comprise a laser for generating light signals for WDM aggregation in metro or transport network applications. However, in one example, a light source of a transceiver for intra-office communications between a transponder and network switch could be either a laser or LED.

At optional step 225, the processing system may detect a receiving of light from the second light source at a different one of the optical transmit/receive device or the network switch. For instance, the optical transmit/receive device or the network switch may be configured to detect the presence or absence of light at a receive component of a transceiver, and may also be configured to report the detection of the presence or absence of light to the processing system via a remote API. For example, the processing system may comprise an SDN controller with one or more control links to the optical transmit/receive device or the network switch. In one example, the optical transmit/receive device or the network switch may report the detecting of the receiving of light from the second light source automatically, or may report in response to a query from the processing system.

At optional step 230, the processing system may activate a third light source at the different one of the optical transmit/receive device or the network switch. Activation of the third light source at optional step 230 may be automatic (e.g., when the optical transmit/receive device comprises a transponder and the third light source is a component of the transponder), or may be via a remote command (when third light source is of either the optical transmit/receive device or the network switch).

At optional step 235, the processing system may detect a receiving of a light from the third light source at the first one of the optical transmit/receive device or the network switch. For example, as mentioned above, the optical transmit/receive device or the network switch may report the detecting of the receiving of a light from the second light source automatically, or may report in response to a query from the processing system.

At optional step 240, the processing system may route light from a fourth light source of the telecommunication network to the port of the optical add/drop multiplexer. For instance, the fourth light source may comprise a network test set or an unassigned transponder at another node of the telecommunication network that may also be activated via a remote command. In one example, step 240 may include the processing system activating (and deactivating) the fourth light source at a different node in the telecommunication network, configuring WSS(s) at optical add/drop multiplexers in the network node(s) to route the light from the fourth light source to the node containing the optical transmit/receive device, and configuring the optical add/drop multiplexer at the node to direct the light from the fourth light source to the particular one of the add/drop ports.

At optional step 245, the processing system may detect a receiving of a light from the fourth light source at the optical transmit/receive device. In one example, the optical transmit/receive device may report the detecting of the receiving of the light from the fourth light source automatically, or may report in response to a query from the processing system.

At step 250, the processing system verifies that the optical transmit/receive device and the port of the optical add/drop multiplexer match a network provisioning order, in response to detecting the receiving of the light from the first light source. In one example, the processing system verifies that the optical transmit/receive device and the port of the optical add/drop multiplexer match the network provisioning order, when both the receiving of the light from the first light source is detected and the receiving of the light from the fourth light source is detected (e.g., when optional steps 240 and 245 are performed). In one example, the verifying further comprises: verifying the optical transmit/receive device and the network switch match the network provisioning order, when the receiving of the light from the second light source is detected (e.g., when optional steps 220 and 225 are performed). In one example, the verifying further comprises verifying that the optical transmit/receive device and the network switch match the network provisioning order, when both the receiving of the light from the second light source is detected and the receiving of the light from the third light source is detected (e.g., when optional steps 220-235 are performed).

The network provisioning order may specify a particular transceiver or transceiver slot of a network switch to connect to the add/drop port, or may more broadly indicate that it is acceptable to connect any free transceiver in any slot to the add/drop port (e.g., where the network switch may comprise a plurality of the same type of transceivers). In another example, the network provisioning order may specify a particular transponder to connect to the add/drop port. In addition, the network provisioning order may specify a particular add/drop port, or may more broadly indicate that it is acceptable to connect the transceiver and/or transponder to any free add/drop port. For instance, the processing system may determine the connectivity based upon the reporting from the respective devices of the receiving of the light from the first light source, the light from the second light source, etc.

At step 255, the processing system generates an indication that the optical transmit/receive device is correctly installed, when the optical transmit/receive device and the port of the optical add/drop multiplexer match the network provisioning order. The indication may comprise at least one of: an entry in a network provisioning system, a visual indication or an audio indication via at least one of the optical transmit/receive device, the optical add/drop multiplexer, a network switch associated with the optical transmit/receive device, or a device of a network technician. In one example, the generating of the indication comprises generating the indication that the optical transmit/receive device is correctly installed when both (1) the optical transmit/receive device and the port of the optical add/drop multiplexer match the network provisioning order and (2) the optical transmit/receive device and the network switch match the network provisioning order (e.g., when steps 220 and 225, and/or steps 220-235 are performed).

Following step 255 the method 200 proceeds to step 295. At step 295, the method 200 ends.

It should be noted that the method 200 may be expanded to include additional steps or may be modified to include additional operations with respect to the steps outlined above. For instance, in one example, the method 200 may be repeated for the installation of various additional optical transmit/receive devices at the same or different nodes in the telecommunication network. In one example, the method 200 may further include establishing a wavelength connection through the telecommunication network that includes the optical transmit/receive device. In addition, in one example, the method 200 may further include provisioning or reconfiguring VNFs and/or NFVI within the network to utilize the wavelength connection. Thus, these and other modifications are all contemplated within the scope of the present disclosure.

FIG. 3 illustrates a flowchart of an example method 300 for verifying that an optical transmit/receive device (e.g., a transponder) is correctly installed. In one example, steps, functions and/or operations of the method 300 may be performed by a network-based device, such as SDN controller 155 in FIG. 1, or any one or more components thereof, such as a processing system. Alternatively, or in addition, the steps, functions and/or operations of the method 300 may be performed by a processing system collectively comprising a plurality of devices as illustrated in FIG. 1, such as SDN controller 105, ROADM 191 and/or ROADM 195, transponders 192 and 196, and/or transceiver 199, network switches 193 and/or 197, node controllers 178 and/or 179, and so forth. In one example, the steps, functions, or operations of method 300 may be performed by a computing device or system 400, and/or a processing system 402 as described in connection with FIG. 4 below. For instance, the computing device 400 may represent at least a portion of a SDN controller, in accordance with the present disclosure. For illustrative purposes, the method 300 is described in greater detail below in connection with an example performed by a processing system, such as processing system 402, or a processing system comprising a plurality of devices. The method 300 begins in step 305 and proceeds to step 310.

At step 310, the processing system activates a first light source of a first one of an optical transponder of a telecommunication network or a network switch of the telecommunication network. In one example, the optical transponder is coupled to the network switch via a fiber optic patch cord. In one example, the first light source is activated by the processing system via a remote command in response to a notification that the optical transponder is installed. For instance, the processing system may comprise an SDN controller of the telecommunication network. The remote command may be in accordance with a remote access API, e.g., using YANG via NETCONF. In an example where the light source comprises a light source of the optical transponder, the processing system may include the optical transponder, and the first light source may be activated by the optical transponder in response to the optical transponder being powered on. In one example, step 310 may comprise the same or similar operations as described above in connection with step 220 and/or step 230 of the example method 200.

At step 315, the processing system detects a receiving of a light from the first light source at a different one of the optical transponder or the network switch. For instance, the optical transponder or the network switch may be configured to detect the presence or absence of a light at a receive component of a transceiver and may further be configured to report the detection of the presence or absence of light to the processing system via a remote API. For example, the processing system may comprise an SDN controller with one or more control links to the optical transponder or the network switch. In one example, the optical transponder or the network switch may report the detecting of the receiving of a light from the first light source automatically, or may report in response to a query from the processing system. In one example, step 315 may comprise the same or similar operations as described above in connection with step 225 and/or step 235 of the example method 200.

At optional step 320, the processing system may activate a second light source at the different one of the optical transponder or the network switch. In one example, the second light source may also be activated via a remote command. In another example, the second light source may be activated by the optical transponder or the network switch in response to the optical transponder or the network switch being powered on. In one example, step 320 may comprise the same or similar operations as described above in connection with step 220 and/or step 230 of the example method 200.

At optional step 325, the processing system may detect a receiving of a light from the second light source at the first one of the optical transponder or the network switch. For instance, the optical transponder or the network switch may be configured to detect the presence or absence of a light at a receive component of a transceiver and may further be configured to report the detection of the presence or absence of light to the processing system via a remote API. For example, the processing system may comprise an SDN controller with one or more control links to the optical transponder or the network switch. In one example, the optical transponder or the network switch may report the detecting of the receiving of a light from the first light source automatically, or may report in response to a query from the processing system. In one example, step 325 may comprise the same or similar operations as described above in connection with step 225 and/or step 235 of the example method 200.

At optional step 330, the processing system may activate a third light source at the optical transponder. For instance, the third light source may be facing an optical add/drop multiplexer (e.g., a ROADM) of the telecommunication network. In one example, the third light source may also be activated via a remote command. In another example, the third light source may be activated by the optical transponder in response to the optical transponder being powered on. It should be noted that the various light sources described in the method 300 may comprise lasers or LEDs. For instance, between the optical transceiver and the optical add/drop multiplexer, the third light source may comprise a laser for generating light signals for WDM aggregation in metro or transport network applications. However, in one example, the first and second light sources for intra-office communications between the transponder and the network switch could be either lasers or LEDs. In one example, step 330 may comprise the same or similar operations as described above in connection with step 210 of the example method 200.

At optional step 335, the processing system may detect a receiving of a light from the third light source at a port of an optical add/drop multiplexer of the telecommunication network. For instance, the optical add/drop multiplexer may be configured to detect the presence or absence of a light at particular add/drop ports, and may further be configured to report the detection of the presence or absence of light to the processing system via a remote API. For example, the processing system may comprise an SDN controller with one or more control links to the optical add/drop multiplexer. In one example, the optical add/drop multiplexer may report the detecting of the receiving of a light from the third light source automatically, or may report in response to a query from the processing system. In one example, step 335 may comprise similar operations as described above in connection with step 215 of the example method 200.

At optional step 340, the processing system may route a light from a fourth light source of the telecommunication network to the port of the optical add/drop multiplexer. For instance, the fourth light source may comprise a network test set or an unassigned transponder at another node of the telecommunication network that may also be activated via a remote command. In one example, step 340 may comprise similar operations as described above in connection with step 240 of the example method 200.

At optional step 345, the processing system may detect a receiving of a light from the fourth light source at the optical transponder. In one example, the optical transponder may report the detecting of the receiving of a light from the fourth light source automatically, or may report in response to a query from the processing system. In one example, step 345 may comprise similar operations as described above in connection with step 245 of the example method 200.

At step 350, the processing system verifies that the optical transponder and the network switch match a network provisioning order, in response to detecting the receiving of the light from the first light source. In one example, the verifying comprises verifying that the optical transponder and the network switch match the network provisioning order, when both the receiving of the light from the first light source is detected and the receiving of the light from the second light source is detected (e.g., when optional steps 320 and 325 are performed). In one example, the verifying further comprises verifying the optical transponder and the port of the optical add/drop multiplexer match the network provisioning order, when the receiving of the light from the third light source is detected (e.g., when optional steps 330 and 335 are performed). In one example, the verifying comprises verifying that the optical transponder and the port of the optical add/drop multiplexer match the network provisioning order, when both the receiving of the light from the third light source is detected and the receiving of the light from the fourth light source is detected (e.g., when optional steps 330-345 are performed). In one example, step 350 may comprise similar operations as described above in connection with step 255 of the example method 200.

At step 355, the processing system generates an indication that the optical transponder is correctly installed, when the optical transponder and the network switch match the network provisioning order. The indication may comprise at least one of: an entry in a network provisioning system, a visual indication or an audio indication via at least one of the optical transceiver, the network switch, an optical add/drop multiplexer associated with the optical transceiver, or a device of a network technician. In one example, the processing system generates the indication that the optical transponder is correctly installed when both (1) the optical transponder and the network switch match the network provisioning order and (2) the optical transponder and the port of the optical add/drop multiplexer match the network provisioning order (e.g., when steps 320 and 325, and/or steps 320-335 are performed). In one example, step 355 may comprise similar operations as described above in connection with step 255 of the example method 200.

Following step 355 the method 300 proceeds to step 395. At step 395, the method 300 ends.

It should be noted that the method 300 may be expanded to include additional steps or may be modified to include additional operations with respect to the steps outlined above. For instance, in one example, the method 300 may be repeated for the installation of various additional optical transponders at the same or different nodes in the telecommunication network. In one example, the method 300 may further include establishing a wavelength connection through the telecommunication network that includes the optical transponder. In addition, in one example, the method 300 may further include provisioning or reconfiguring VNFs and/or NFVI within the network to utilize the wavelength connection. Thus, these and other modifications are all contemplated within the scope of the present disclosure.

In addition, although not specifically specified, one or more steps, functions or operations of the method 200 or the method 300 may include a storing, displaying, and/or outputting step as required for a particular application. In other words, any data, records, fields, and/or intermediate results discussed in the example method 200 or method 300 can be stored, displayed, and/or outputted to another device as required for a particular application. Furthermore, steps or blocks in FIG. 2 or 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for verifying that an optical transmit/receive device is correctly installed, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 or method 300 as discussed above is implemented in a distributed or parallel manner for a particular illustrative example, i.e., the steps of the above method 200 or method 300, or the entire method 200 or method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the methods discussed above can be used to configure a hardware processor to perform the steps, functions and/or operations of the above disclosed method 200 and/or method 300. In one example, instructions and data for the present module or process 405 for verifying that an optical transmit/receive device is correctly installed (e.g., a software program comprising computer-executable instructions) can be loaded into memory 404 and executed by hardware processor element 402 to implement the steps, functions, or operations as discussed above in connection with the illustrative method 200 and/or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for verifying that an optical transmit/receive device is correctly installed (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

activating, by a processing system including at least one processor, a first light source of an optical transmit/receive device of a telecommunication network, wherein the processing system includes the optical transmit/receive device, and wherein the first light source is activated by the optical transmit/receive device in response to the optical transmit/receive device being powered on;

detecting, by the processing system including the optical transmit/receive device, a receiving of a light from the first light source at a port of an optical add/drop multiplexer of the telecommunication network via a notification from the optical add/drop multiplexer;

routing, by the processing system including the optical transmit/receive device, a light from a second light source of the telecommunication network to the port of the optical add/drop multiplexer;

detecting, by the processing system including the optical transmit/receive device, a receiving of the light from the second light source at the optical transmit/receive device;

verifying, by the processing system including the optical transmit/receive device, that the optical transmit/receive device and the port of the optical add/drop multiplexer match a network provisioning order, wherein the verifying comprises determining that the light from the first light source was received at the port of the optical add/drop multiplexer and determining that the light from the second light source was received at the optical transmit/receive device; and generating, by the processing system including the optical transmit/receive device, an indication that the optical transmit/receive device is correctly installed, when the optical transmit/receive device and the port of the optical add/drop multiplexer match the network provisioning order.

2. The method of claim 1, wherein the optical transmit/receive device comprises a transceiver integrated into a network switch.

3. The method of claim 1, wherein the indication comprises at least one of:
a visual indication via the optical transmit/receive device or an audio indication via the optical transmit/receive device.

4. The method of claim 1, wherein the indication comprises at least one of:
a visual indication via the optical add/drop multiplexer or an audio indication via the optical add/drop multiplexer.

5. The method of claim 1, wherein the indication comprises at least one of:
a visual indication via a network switch associated with the optical transmit/receive device or an audio indication via the network switch associated with the optical transmit/receive device.

6. The method of claim 1, wherein the indication comprises at least one of:
a visual indication via a device of a network technician or an audio indication via the device of the network technician.

7. The method of claim 1, wherein the indication comprises an entry in a network provisioning system.

8. A non-transitory computer-readable medium storing instructions which, when executed by a processing system including at least one processor, cause the processing system to perform operations, the operations comprising:
activating a first light source of an optical transponder of a telecommunication network, wherein the processing system includes the optical transponder, and wherein the first light source is activated by the processing system including the optical transponder in response to the optical transponder being powered on;
detecting a receiving of a light from the first light source at a network switch of the telecommunication network, wherein the detecting is performed by the processing system including the optical transponder in response to receiving a notification from the network switch;
activating a second light source at the network switch;
detecting a receiving of a light from the second light source at the optical transponder;
verifying that the optical transponder and the network switch match a network provisioning order, wherein the verifying is performed by the processing system including the optical transponder, and wherein the verifying comprises determining that the light from the first light source was received at the network switch and determining that the light from the second light source was received at the optical transponder; and
generating an indication that the optical transponder is correctly installed, wherein the generating is performed by the processing system including the optical transponder in response to the optical transponder and the network switch matching the network provisioning order.

9. The non-transitory computer-readable medium of claim 8, wherein the indication comprises at least one of:
an entry in a network provisioning system;
a visual indication via the optical transponder; or
an audio indication via the optical transponder.

10. The non-transitory computer-readable medium of claim 8, wherein the indication comprises at least one of:
an entry in a network provisioning system;
a visual indication via the network switch; or
an audio indication via the network switch.

11. The non-transitory computer-readable medium of claim 8, wherein the indication comprises at least one of:
an entry in a network provisioning system;
a visual indication via an optical add/drop multiplexer associated with the optical transponder; or
an audio indication via the optical add/drop multiplexer associated with the optical transponder.

12. The non-transitory computer-readable medium of claim 8, wherein the indication comprises at least one of:
an entry in a network provisioning system;
a visual indication via a device of a network technician; or
an audio indication via the device of the network technician.

13. A method comprising: activating, by a processing system including at least one processor, a first light source of an optical transponder of a telecommunication network, wherein the processing system includes the optical transponder, and wherein the first light source is activated by the optical transponder in response to the optical transponder being powered on;
detecting, by the processing system including the optical transponder, a receiving of a light from the first light source at a network switch of the telecommunication network via a notification from the network switch;
activating, by the processing system including the optical transponder, a second light source at the network switch;
detecting, by the processing system including the optical transponder, a receiving of a light from the second light source at the optical transponder;
verifying, by the processing system including the optical transponder, that the optical transponder and the network switch match a network provisioning order, wherein the verifying comprises determining that the light from the first light source was received at the network switch and determining that the light from the second light source was received by the optical transponder; and
generating, by the processing system including the optical transponder, an indication that the optical transponder is correctly installed, when the optical transponder and the network switch match the network provisioning order.

14. The method of claim 13, wherein the indication comprises:
an entry in a network provisioning system.

15. The method of claim 13, wherein the indication comprises a visual indication or an audio indication via the optical transponder.

16. The method of claim 13, wherein the indication comprises a visual indication or an audio indication via the network switch.

17. The method of claim 13, wherein the indication comprises a visual indication or an audio indication via an optical add/drop multiplexer associated with the optical transponder.

18. The method of claim 13, wherein the indication comprises a visual indication or an audio indication via a device of a network technician.

19. The method of claim 13, wherein the optical transponder is physically connected to a reconfigurable optical add/drop multiplexer.

20. The method of claim 19, wherein the network switch includes an integrated optical transceiver that is connected to the optical transponder.

\* \* \* \* \*